United States Patent
Mirault

(10) Patent No.: US 8,628,662 B2
(45) Date of Patent: Jan. 14, 2014

(54) FILTERING DEVICE COMPRISING MEMBRANE FILTERING MODULES AND ASSEMBLY OF MODULES FOR SUCH A DEVICE

(75) Inventor: Frédéric Mirault, Maule (FR)

(73) Assignee: Degremont (FR)

( * ) Notice: Subject to any disclaimer, the term of this patent is extended or adjusted under 35 U.S.C. 154(b) by 0 days.

(21) Appl. No.: 13/634,046

(22) PCT Filed: Mar. 9, 2011

(86) PCT No.: PCT/IB2011/050981
§ 371 (c)(1),
(2), (4) Date: Sep. 11, 2012

(87) PCT Pub. No.: WO2011/111003
PCT Pub. Date: Sep. 15, 2011

(65) Prior Publication Data
US 2013/0001146 A1    Jan. 3, 2013

(30) Foreign Application Priority Data

Mar. 11, 2010 (FR) ...................................... 1000978
Mar. 11, 2010 (FR) ...................................... 1000979

(51) Int. Cl.
*B01D 63/04* (2006.01)
*B01D 63/06* (2006.01)
*B01D 63/12* (2006.01)

(52) U.S. Cl.
USPC ... 210/232; 210/240; 210/321.6; 210/321.88; 210/321.89; 210/323.2; 210/340

(58) Field of Classification Search
USPC .................. 210/232, 323.2, 240, 321.6, 340, 210/321.88, 321.89
See application file for complete search history.

(56) References Cited

U.S. PATENT DOCUMENTS 5,766,460 A * 6/1998 Bergstrom et al. ......... 210/198.2
6,942,785 B2 * 9/2005 Bayer et al. ..................... 210/91

FOREIGN PATENT DOCUMENTS

| EP | 1078679 A1 | 2/2001 |
| EP | 1897602 A1 | 3/2008 |
| FR | 2912321 A1 | 8/2008 |
| JP | 2001321642 A | 11/2001 |
| JP | 2003334429 A | 11/2003 |
| WO | WO-2008071516 A1 | 6/2008 |

* cited by examiner

*Primary Examiner* — Thomas M Lithgow
(74) *Attorney, Agent, or Firm* — The Belles Group, P.C.

(57) ABSTRACT

The invention relates to a device for filtering a liquid, in particular water, comprising membrane filtering modules, connected by pipes to valves for controlling the flows of liquid travelling towards the modules and coming from same, including a first block made up of an assembly (14a) of membrane filtering modules, a second block made up of a system of valves (14b), and a third block made up of a group of intermediate pipes (14c) comprising an interface between the system of valves (14b) and the assembly of modules (14), only the interface (14c) requiring to be changed when changing the type of filtering modules, while the system of valves (14b) and the assembly of modules (14a) remain unchanged, except when changing the type of modules.

10 Claims, 4 Drawing Sheets

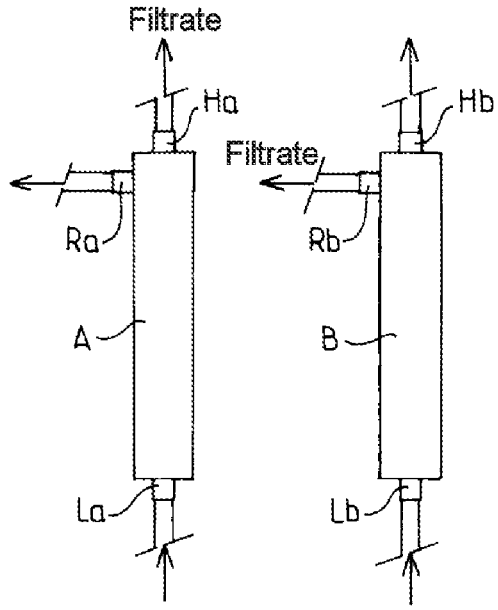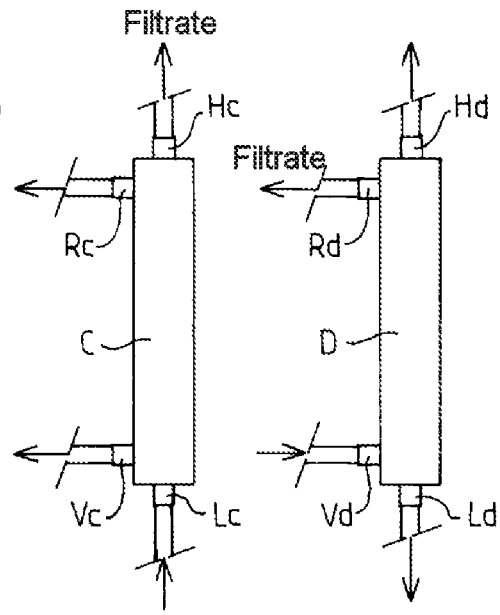
FIG.5    FIG.6    FIG.7    FIG.8
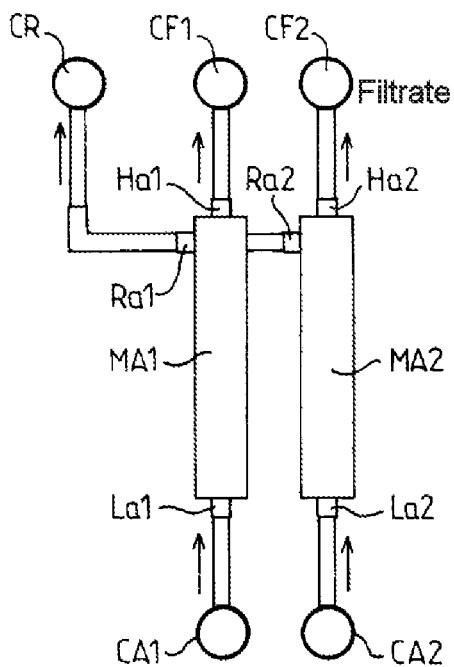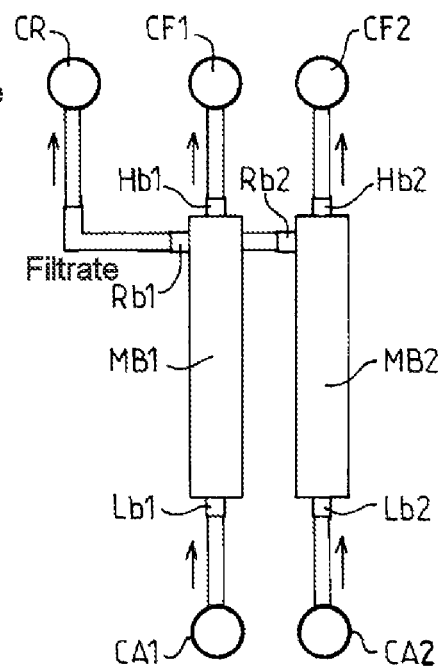
FIG.9    FIG.10

FILTERING DEVICE COMPRISING MEMBRANE FILTERING MODULES AND ASSEMBLY OF MODULES FOR SUCH A DEVICE

PRIORITY

Priority is claimed as a national stage application, under 35 U.S.C. §371, to PCT/IB2011/050981, filed Mar. 9, 2011, which claims priority to French Application No. 1000978, filed Mar. 11, 2010, and French Application No. 1000979, filed Mar. 11, 2010. The disclosures of the aforementioned priority applications are incorporated herein by reference in their entirety.

The invention relates to the field of the design and production of membrane filtering systems for liquids, and more particularly for waters which are designed for consumption, industrial applications, waste water treatments and reuse, these systems implementing ultra-filtering and micro-filtering modules.

Ultra-filtering and micro-filtering membrane filtering systems use modules comprising:
an outer envelope which is positioned vertically;
one or a plurality of membranes situated in the interior of the envelope; and
three or four tap-offs for: the supply of the modules; the discharge of the filtered water which is known as the "filtrate"; the discharge of the back-flush which is known as "residue"; and emptying of the module.

The characteristics of a module can vary from one manufacturer to another. The envelope can have a longer or shorter length, and the diameter can be different. The membranes can be of the type with hollow fibers, of a different number and with different diameters, thus resulting in a variable membrane surface. The positioning, type and diameter of the tap-offs are also variable according to the manufacturers.

The modules are implemented in the form of an assembly in which they are installed vertically according to at least one row, the modules of each row having their parallel vertical axes situated on the same plane, each module comprising in its lower part an axial tap-off for the supply of liquid to be treated, and in particular water, and in its upper part an upper axial tap-off for filtrate or residue, and a lateral tap-off for residue or filtrate, said assembly comprising at least a supply collector, a filtrate collector and a residue collector which are secured to a frame, and a support means for the modules.

When an assembly module no longer fulfills its function correctly, it becomes necessary to replace it. For this replacement it is possible that it may be desirable to put into place a module which is different from the one which has been removed, and in particular a module with a different length.

The object of the invention is above all to provide a filtering device which makes it possible to replace the modules and/or the assemblies of modules quickly and easily, without being limited to a specific type of module.

According to the invention, a device for filtering of liquid, in particular water, comprising membrane filtering modules which are connected by means of pipes to valves in order to control the flows of liquid going to and from the modules, is characterized in that it comprises a first block made up of an assembly of membrane filtering modules, a second block made up of a system of valves, and a third block made up of a group of intermediate pipes constituting an interface between the system of valves and the assembly of modules, only the interface requiring to be changed when changing the types of filtering modules, whilst the system of valves and the assembly of modules, except for changing the type of modules, remain unchanged.

The term "block" designates a "unit" which can be connected to, or separate from, another block or unit.

Advantageously, the group of intermediate pipes is broken down into as many groups as there are different types of modules, each different group being designed for an assembly with modules of the associated type.

The device for filtering of liquid can comprise:
an assembly of membrane filtering modules, each module comprising a lower tap-off, in general for the supply of liquid to be treated, an upper tap-off for filtrate or residue, and a lateral tap-off for residue or filtrate, the assembly comprising at least a supply collector, a filtrate collector and a residue collector which are secured in a frame which is distinct from the collectors;
a system of valves to control the flows of liquid going to and from the assembly of modules; and
a group of intermediate pipes between the system of valves and the assembly of modules, and is characterized in that:
the system of valves is installed in a casing according to a fixed configuration;
the frame of the assembly of modules is designed to receive at least two types of modules, i.e. a first type with an upper axial tap-off for the filtrate and a lateral tap-off for the residue, and a second type with an upper axial tap-off for the residue and a lateral tap-off for the filtrate, with the passage from one type to the other giving rise to a change-over of the functions of the collectors; and
at least one group of intermediate pipes which is associated respectively with each type of modules, and is designed to be put into place in a removable manner between the assembly of modules and the system of valves, and to assure the change-over of the collectors according to the type of modules.

Preferably, the group of intermediate pipes does not comprise any valve.

Preferably, the liquid filtering device comprises as many groups of intermediate pipes as there are different types of membrane filtering modules.

The liquid filtering device can comprise an assembly of filtering modules installed vertically according to at least one row, the modules of each row having their parallel vertical axes situated on the same plane, each module comprising in its lower part an axial tap-off for the supply of liquid to be treated, and in particular water, and in its upper part an upper axial tap-off for filtrate or residue, and a lateral tap-off for residue or filtrate, said assembly comprising at least:
a lower collector below the modules, the geometric axis of this collector being situated on the vertical plane of the axes of the modules of the row, with rising vertical piping which can be connected to the axial supply tap-offs;
an upper collector above the modules, the geometric axis of this collector being situated on the vertical plane of the axes of the modules, this collector comprising descending vertical piping for connection to the axial tap-offs of the modules, the gap between the lower collector and the upper collector being fixed; characterized in that:
the lower collector is designed to be strong enough to constitute the means for support of the modules of the row, the lower tap-offs of which are applied against the rising piping;
the filtering modules have different lengths;

the gap between the lower collector and the upper collector is determined in order to make it possible to receive the module with the longest length; and straight adapters are provided in order to permit fitting of shorter modules, and are arranged at the end of the upper tap-offs, coaxially to the modules and to the piping.

Preferably, the assembly of membrane filtering modules comprises as many lower supply collectors and upper collectors for axial tap-offs as there are rows of modules.

Advantageously, the lower collector is designed to receive a load of 180 kg per tap-off.

The axial tap-offs of the modules can be arranged so as to be supported against the end of the connection piping, the sealing being carried out at the level of the junction by means of sealing rings.

According to the invention, axial support of the modules is assured by the lower collector, which facilitates the interchangeability of the modules and reduces the costs of manufacturing the frame of the assembly. The integral weight of the module is taken up on the lower tap-off, which itself is connected to the supply collector, optionally with an intermediate part if an adaptation is necessary.

The adaptation parts are particularly simple, since they involve straight parts which are arranged according to the geometric axis of the modules.

Advantageously, the lengths of the adapters are designed such that the upper end of the adapters is in the vicinity of the lower end of the piping when the adapters are supported against the upper tap-offs, and the sealing of the junction between the adapters and the piping is carried out by means of a sliding sleeve which is equipped with internal sealing means, the sleeve being in the retracted position on the adapter in order to allow the putting into place below the piping, then this sleeve is displaced upwards in order to cover the junction and establish the sealing.

The filtering device can be broken down into as many intermediate groups as there are different types of modules, according to which the upper axial tap-off is designed for the discharge of the filtrate or residue, whilst the upper lateral tap-off is designed for the discharge of the residue or filtrate, each intermediate group being designed for an assembly with modules of an associated type.

Apart from the above-described arrangements, the invention consists of a certain number of other arrangements which will be described more explicitly hereinafter in relation to embodiments which are described with reference to the appended drawings, but are in no way limiting. In these drawings:

FIGS. 5-8 are schematic views of different types of modules.

FIG. 9 is a schematic view of the connection of two modules of a first type with axial discharge of the filtrate and lateral discharge of the residue, according to the invention.

FIG. 10 is a diagram similar to that of FIG. 9, illustrating the connection with modules of a second type with lateral discharge of the filtrate and axial discharge of the residue.

Figure 12:
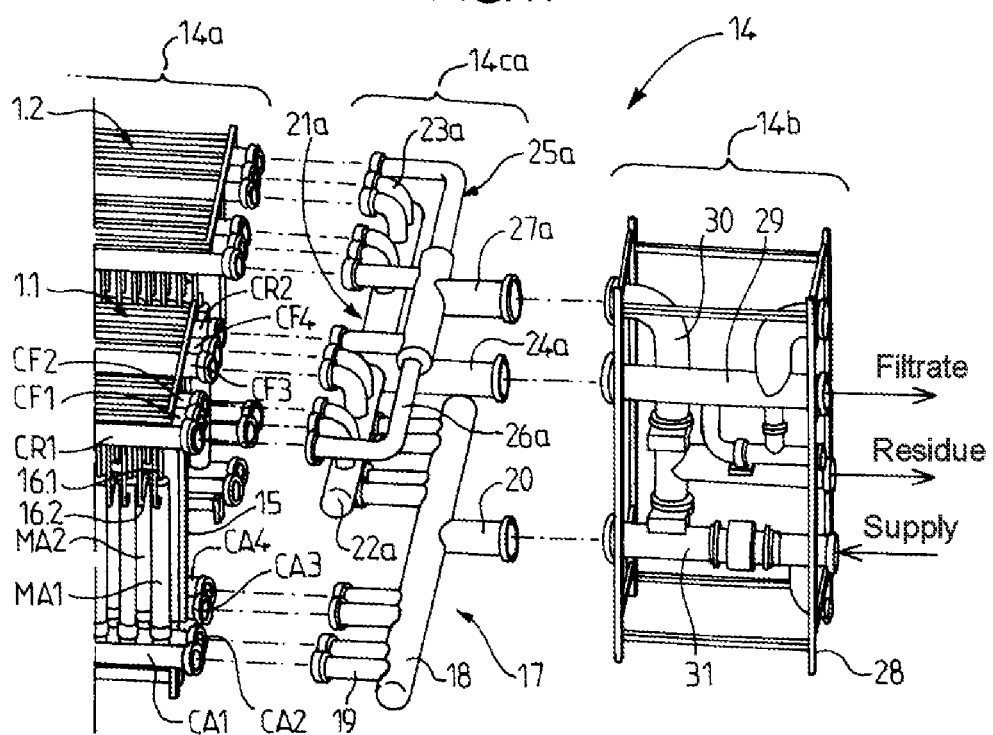
FIG. 12 is a partial, exploded perspective view of a filtering device according to the invention, with an assembly of modules of a first type A and an appropriate group of intermediate pipes.
Figure 13:
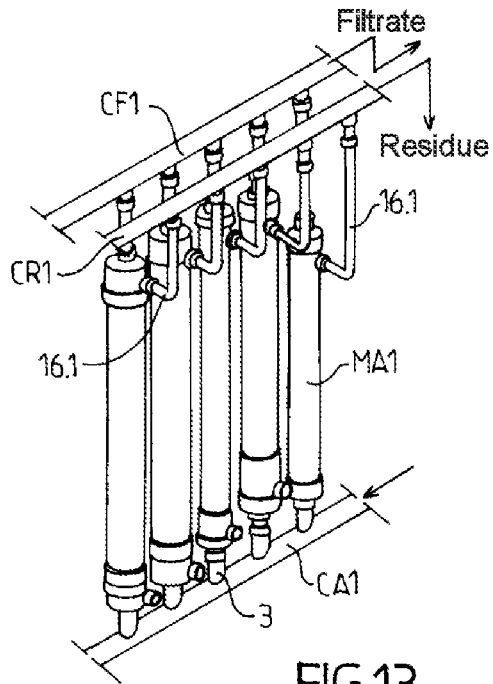
FIG. 13 is a perspective view of a row of modules of type A with the horizontal collectors.
Figure 15:
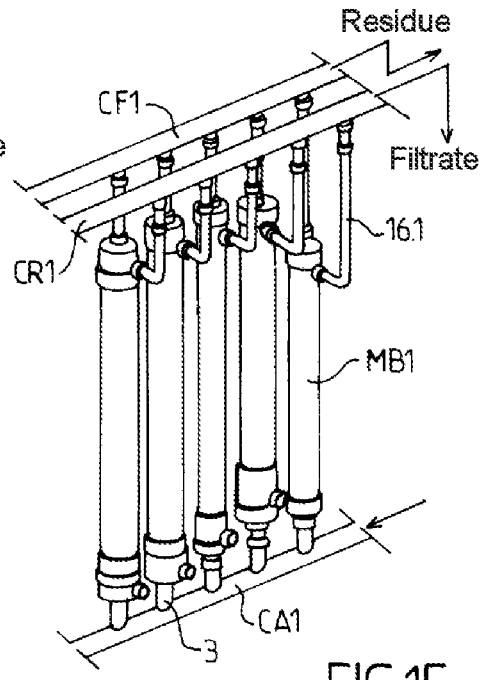
Figure 14:
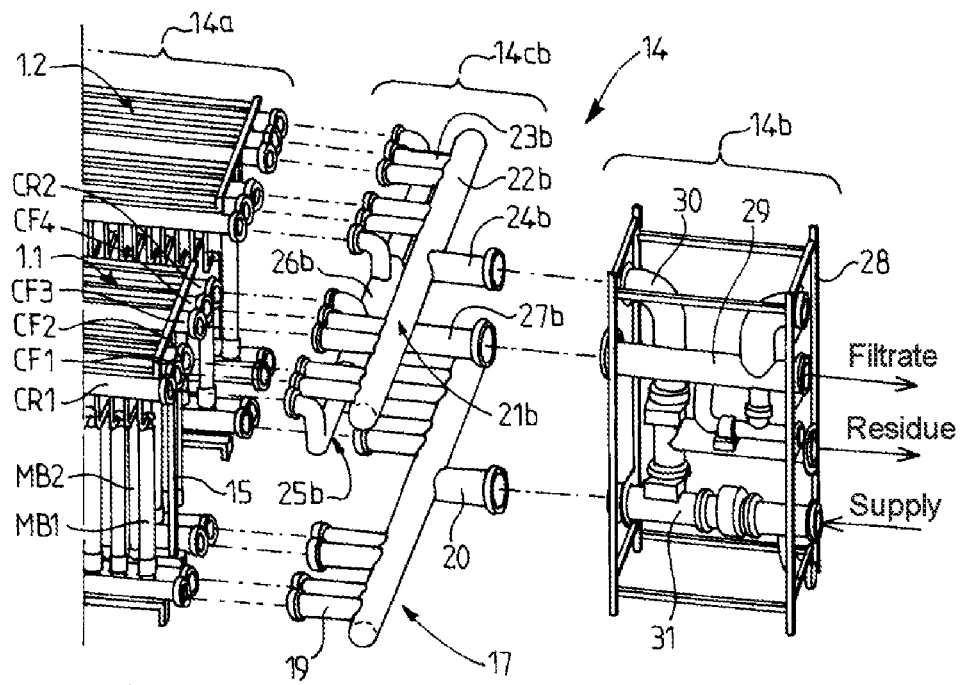

Similarly to FIG. 12, FIG. 14 shows the filtering device with an assembly of modules of a second type B, and an appropriate group of intermediate pipes; and Similarly to FIG. 13, FIG. 15 shows in perspective a row of modules of type B.

Figure 1:
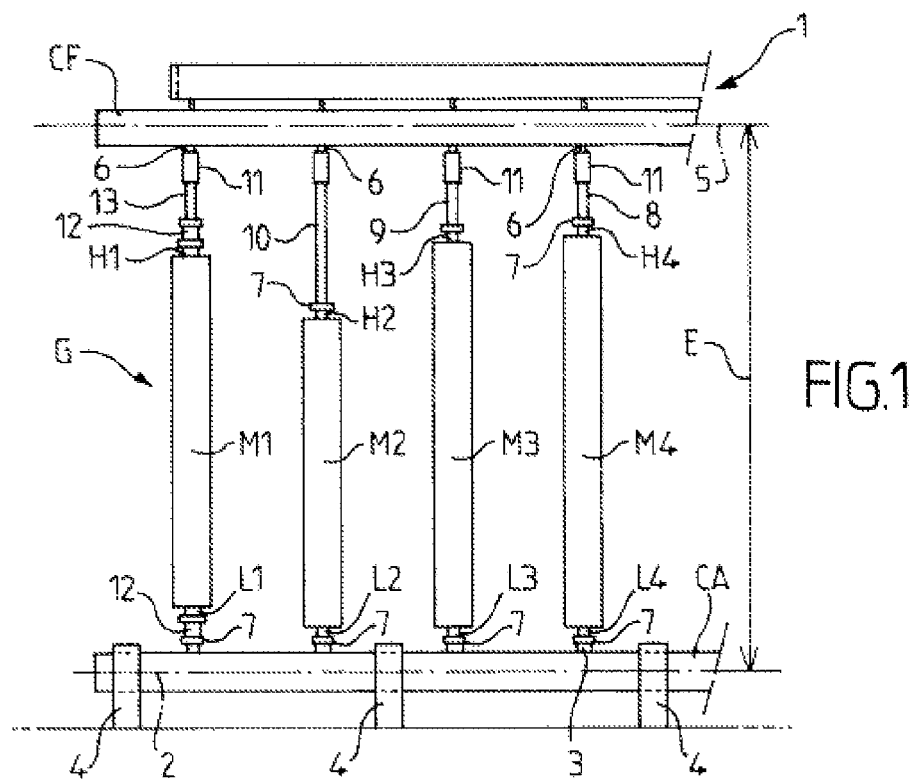
FIG. 1 is an elevated view of a row of four vertical modules with different lengths, in an assembly according to the invention.

FIG. 1 of the drawings shows an assembly G of membrane filtering modules M1, M2, M3, M4 installed vertically according to at least one row, the modules having their parallel vertical geometric axes situated on the same plane. In the example concerned, four modules are provided in a row; it will be appreciated that this number can be different, and in particular more than four. Each module comprises in its lower part an axial tap-off L1, L2, L3, L4 for supply of liquid to be treated, in particular water, and in its upper part it has an upper axial tap-off H1, H2, H3, H4 for filtrate or residue. An upper lateral tap-off which is not shown in FIG. 1 is also provided for residue or filtrate.

The assembly comprises at least a lower supply collector CA, an upper filtrate or residue collector CF, and an upper lateral collector for residue or filtrate which is not shown in FIG. 1. The collectors CA, CF are secured to a frame 1, which in particular is made of metal tubes and profiles. The gap E between the geometric axes of the collectors CA, CF is fixed.

The lower collector CA can be slightly inclined in the direction which assists the flow, and its geometric axis 2 is situated on the vertical plane of the geometric axes of the modules M1-M4 of the row. The lower collector CA is provided with rising vertical piping 3 which can be connected to the lower axial tap-offs L1-L4. The piping 3 is preferably identical.

The lower collector CA is constituted by a cylindrical tube, and is strong enough to constitute the support means for the modules M1-M4 of the row. The integral weight of a module is taken up by its lower tap-off L1-L4, which itself is connected to, and supported on the piping 3 of the supply collector. The collector CA is designed to receive a load of 180 kg per tap-off.

The tube which constitutes the collector CA is retained, relative to the frame 1, by spaced collars 4, situated between two sets of piping 3.

The upper collector CF for the filtrate or residue can be slightly inclined in the direction which assists the flow, above the modules, and its geometric axis 5 is situated on the vertical plane of the geometric axes of the modules M1-M4, which plane contains the geometric axis of the lower collector CA. The upper collector CF, which is generally constituted by a cylindrical tube, comprises descending vertical piping 6, which is identical and coaxial to the piping 3 of the lower collector.

The gap E between the collectors CA and CF is designed to make it possible to accept the modules with the longest length.

According to the example in FIG. 1, the module M4 is the longest, and the module M2 is the shortest. The modules M1, M3 have an intermediate length. The lower and upper tap-offs of the modules M2, M3 and M4 have the same diameter as the piping 3 and 6. On the other hand, the tap-offs L1 and H1 of the module M1 have a diameter which is larger than that of the piping 3 and 6.

The fitting of the modules M2-M4 between two associated sets of piping 3 and 6 is carried out as follows.

The lower tap-offs L2-L4 are applied end to end against the piping 3. A sealing ring 7, in particular of the type with two half-shells assembled in order to clamp the tap-offs and piping, is then put into place around the tap-offs L2-L4 so as to cover the junction of the tap-offs and the piping, and establish the sealing.

In the top part, adapters 8, 9, 10 formed by straight tubular elements are arranged at the end of the tap-offs H4, H3, H2, coaxially to the modules and the piping 6. The lengths of the adapters 8, 9 and 10 are designed such that the upper end of the adapters is in the vicinity of the lower end of the piping 6 when the adapters are supported against the tap-offs H4, H3, H2. The sealing of the junction of the adapter and of the tap-off is carried out by means of a ring 7 which is similar to that for the lower tap-offs. The sealing of the junction between the adapters 8, 9, 10 and the piping 6 is carried out by means of a sliding sleeve 11 equipped with internal sealing means. The sleeve 11 is in the retracted position on the adapter 8, 9, 10 in order to permit putting into place below the piping 6, then this sleeve 11 is displaced upwards so as to cover the junction and establish the sealing.

Figure 2:
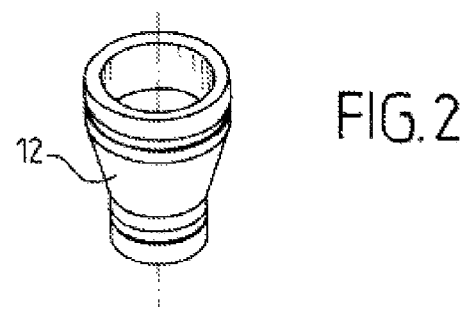
FIG. 2 is a perspective view of an adapter for a change of diameter.

For the module M1, the tap-offs L1 and H1 of which have a diameter which is greater than that of the piping 3, 6, an adaptation part 12, which can be seen clearly in FIG. 2, assures the reduction of diameter between the tap-off L1, H1 and the piping 3, 6. The part 12 has a frusto-conical form with two cylindrical end support surfaces. A straight adapter 13 is provided in the top part between the part 12 and the piping 6. The sealing of the junctions between the different parts is carried out as previously explained for the modules M4-M2, with a ring 7 and sleeve 11 which slide, and have an appropriate diameter.

An assembly according to the invention makes it possible to put into place a module with a length which is different from the module originally provided. The adaptation is carried out by fitting of coaxial intermediate parts which assure the direct transmission of the load from the module to the lower collector CA, whilst avoiding offsetting of the load which would give rise to torsional moment on the lower collector CA.

The parts at the top and bottom part on the axis of the module are advantageously made of rigid or semi-rigid material. The lateral parts are made of semi-rigid or flexible material. A transparent or translucent part can be added, in particular at the level of the adapters 8, 9, 11 or 13, in order to check for the absence of bubbles during an intactness test by means of a pressure maintenance method. The locations where modules on the collectors are not used are shut off by means of stoppers and collars.

Figure 3:
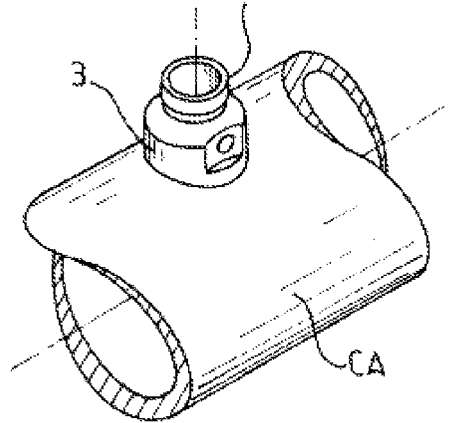
FIG. 3 is a perspective view of part of a lower collector with rising piping.

FIG. 3 illustrates part of the lower collector CA with piping 3 in order to connect the lower axial tap-off of a module. This piping 3 comprises a flange 3a with a reduced diameter, around which the sealing ring 7 can be engaged.

Figure 4:
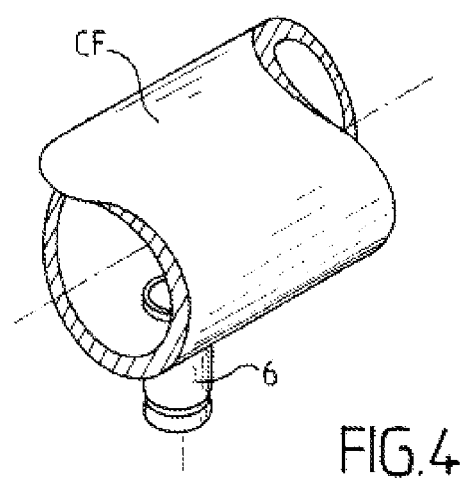
FIG. 4 is a perspective view of part of an upper collector with descending piping.

FIG. 4 shows in perspective part of the upper collector CF, with descending piping 6.

The axial support which is provided in an assembly according to the invention facilitates the interchangeability of the modules and reduces the manufacturing cost of the frame 1.

The membrane filtering modules can not only have different lengths as described with reference to FIG. 1, but can also have tap-offs which are arranged differently, as illustrated in FIGS. 5-8.

FIG. 5 shows a module of type A wherein the lower axial tap-off La is designed for the supply of liquid to be treated, and the upper axial tap-off Ha is designed for the discharge of the filtrate, whereas the upper lateral tap-off Ra is designed for the discharge of the residue. The modules of type A can have sizes, i.e. length and diameter, which are different. The modules of the same type A, but which have different dimensions, can be assembled in the same row, as illustrated in FIG. 1.

FIG. 6 shows a module of type B wherein the lower axial tap-off Lb is used for the supply of liquid to be treated, whereas the upper axial tap-off Hb is used for the discharge of the residue. The upper lateral tap-off Rb is used for the discharge of the filtrate. The functions of the upper tap-offs Hb, Rb have been changed over in comparison with the arrangement in FIG. 5.

FIG. 7 illustrates a module of type C which comprises three tap-offs Lc, Hc, Rc which have the same functions as for the module A in FIG. 5, and a fourth lateral lower tap-off Vc for the emptying.

FIG. 8 illustrates another type D of module, wherein the lower axial tap-off Ld is designed for the emptying, the upper axial tap-off Hd is designed for the discharge of the residue, and the upper lateral tap-off Rd is designed for the discharge of the filtrate. A lower lateral tap-off Vd is designed for the supply of liquid to be filtered.

For fitting in a filtering device according to the invention, the modules of type C are turned into type A by shutting off the lower tap-off Vc. The modules of type D are turned into type B by shutting off the lower lateral tap-off Vd and assuring the supply via the axial lower tap-off Ld.

FIGS. 9 and 10 are diagrams illustrating the change-over of the functions of the upper collectors when modules of type A (FIG. 9) are changed into modules of type B (FIG. 10).

According to FIG. 9, two rows of modules of type A are provided, perpendicular to the plane of the figure. The modules of each row are situated to the rear or the front of the modules MA1 and MA2 represented. For each row of modules, the following are provided:

for the axial lower tap-offs, a lower collector CA1, CA2 perpendicular to the plane of FIG. 9; and for the axial upper tap-offs, an upper collector CF1, CF2 perpendicular to the plane of FIG. 9.

The geometric axes of the lower collectors CA1, CA2 and upper collectors CF1, CF2 are situated on the vertical plane of each of the rows corresponding to the modules MA1, MA2. A lateral upper collector CR is also provided. The collectors occupy fixed positions in the frame. The lower tap-offs La1, La2 are connected to the lower collectors by vertical axial ducts. The upper tap-offs Ha1 and Ha2 are also connected by axial vertical ducts to the upper collectors CF1 and CF2, which receive the filtrate. The lateral tap-offs Ra1, Ra2 are connected laterally to the collectors CR which receive the residue.

In the case of FIG. 10, where the modules are of type B, the schematic connections remain the same, but the functions of the collectors CF1, CF2 on the one hand and CR on the other hand are changed over. The collector CR becomes a filtrate collector and the collectors CF1, CF2 become residue collectors.

Figure 11:
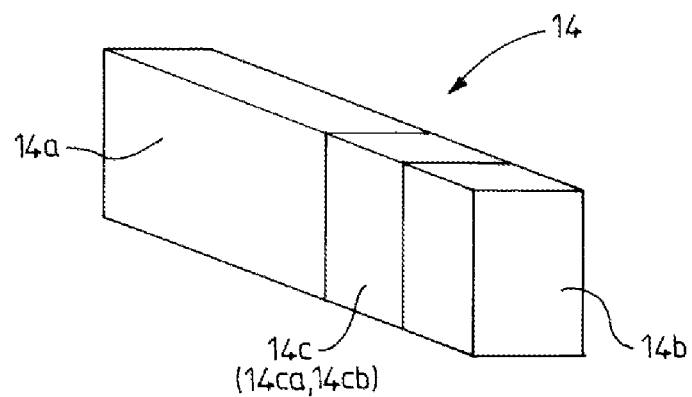
FIG. 11 is a schematic view of blocks constituting a device according to the invention.

In order to make it possible to carry out this change-over with a minimum of operations, according to the invention a liquid filtering device 14 (FIG. 11) comprises a first block made up of an assembly 14a of membrane filtering modules, a second block made up of a system of valves 14b in order to control the flows of liquid going to and from the assembly, and a third block made up of a group of intermediate pipes 14c between the system of valves 14b and the assembly of modules 14a. The group 14c is broken down into a group 14ca (FIG. 12) designed for an assembly with modules of type A and a group 14b (FIG. 14) for an assembly with modules of type B. The broken-down groups 14ca, 14cb of the group 14c constitute interfaces to be changed only when the type of module is changed. Preferably, the interfaces do not comprise any valve.

The configuration in space of the connection apertures in the first block or assembly 14a remains the same in space if the type of modules is changed. The configuration of the connection apertures in the second block, formed by the system of valves 14b, remains the same in space. The configuration in space of the connection apertures in the different interfaces 14ca, 14cb formed by the third blocks corresponding to the different types of modules remains the same, in order to be positioned respectively opposite the apertures in the first and second blocks.

Advantageously, the different connection apertures in the blocks are situated on planes which, after the different blocks have been connected, are at right-angles to the parallel geometric axes of the filtering modules.

FIG. 12 illustrates in partially exploded perspective a filtering device 14 according to the invention, comprising an assembly 14a equipped with filtering modules of type A. In the example represented, the device 14 comprises two frames 1.1, 1.2 with an identical composition, only one of which will be described, since the other frame can be deduced accordingly.

The frame 1.1 comprises in the bottom part two groups of two supply collectors CA1, CA2 and CA3, CA4 which assure the take-up of the weight of the modules such as MA1, MA2 of each row, which modules are arranged above these collectors. The vertical plane of a row passes via the geometric axis of the associated collector. The two groups of two collectors are arranged on both sides of a vertical mediator plane of the frame 1.1., which plane takes the form of vertical uprights 15, of which there are for example three, provided at the two ends and in the middle.

A filtering device according to the invention is designed to make it possible to carry out quickly and easily a change of modules of type A into modules of type B or conversely.

Above each lower collector CA1-CA4 there is arranged vertically a row of modules of type A, MA1, MA2, the lengths and diameters of which can be different. Each row is arranged relative to the lower collector as explained with reference to FIG. 1.

Above the rows of modules, and vertically relative to the lower collectors CA1-CA4, upper collectors CF1-CF4 are arranged, the geometric axes of which are situated on vertical planes which pass via the geometric axes of the lower collectors and the corresponding modules. In the case of modules of type A, these upper collectors CF1-CF4 receive the filtrate. The geometric axes of the collectors CF1-CF4 are situated on the same upper horizontal plane, whereas the geometric axes of the lower collectors CA1-CF4 are also situated on the same lower horizontal plane.

On both sides of the group of four upper collectors CF1-CF4 corresponding to the four rows of vertical modules, two lateral collectors CR1, CR2 are provided parallel to the collectors CF1-CF4, preferably with their geometric axes situated on the same plane as that of the axes of the collectors CF1-CF4. In the case of modules of type A the lateral collectors CR1, CR2 receive the residue. The upper lateral tap-offs of the modules MA1 of the first row are connected to descending piping of the lateral collector CR1 by bent channels 16.1 comprising a horizontal branch and a vertical branch. Similarly, the modules MA2 of the second row, which are transversely further away than the first row of the collector CR1, are connected to the latter by bent channels 16.2, the horizontal branch of which is longer than that of the channels 16.1. The horizontal branch of the channels 16.2 passes between two modules MA1 of the first row. The vertical branches of the channels 16.1, 16.2 are situated on the same vertical plane which passes via the longitudinal geometric axis of the collector CR1. A similar arrangement is provided for the two other rows of modules corresponding to the collectors CA3, CA4 and the lateral collector CR2.

The other assembly of modules 1.2 is symmetrical to the first assembly 1.1 concerning the different collectors and the frame, relative to a median vertical plane which is parallel to the geometric axes of the collectors. The filtering modules can have different sizes and dimensions, but must be of the same type A as those of the assembly 1.1.

The lower collectors CA1-CA4 have the same lengths and their ends are situated on the same vertical plane, at right-angles to the geometric axis of these collectors. One of the ends of the collectors is closed by a removable stopper, i.e. the end (not shown) which is situated on the left in FIG. 12, whereas the other end, which is situated towards the right according to FIG. 12, is designed to be connected to an intermediate supply pipe 17 comprising a transverse channel 18 on the plane of the lower collectors, which pipe is provided with four groups of tubular connections 19 which are in the extension of the lower collectors CA1-CA4, to which they are connected in a sealed manner by flanges with seals.

On the side opposite the connections 19, the intermediate pipe 17 comprises central piping 20 parallel to the collectors CA1-CA4, which is provided at its end distant from the transverse tube 18 with a flange for connection to the system of valves 14b.

The upper collectors CF1-CF4, which have the same length, have their ends situated on the same vertical plane at right-angles to the geometric axes of the collectors. One end, i.e. the left end (not shown) according to FIG. 12, of the collectors CF1-CF4 is closed by a removable stopper. The other ends of these collectors CF1-CF4 are open in order to be connected by means of flanges to an intermediate pipe 21a comprising a transverse tube 22a which is closed at its ends and is situated at a level lower than that of the collectors. The tube 22a is provided on its upper part with connection elements which are formed by bends 23a, at 90°, the open ends of which are opposite the open ends of the collectors CF1-CF4 in order to be connected to the latter in a sealed manner by flanges with seals. A median discharge channel 24a, parallel to the upper collector, is provided for the connection to the system of valves 14b.

The lateral collectors CR1, CR2 of the two assemblies are also closed at their left end (not shown) and open at their right end, which is preferably situated on the same vertical plane as the ends of the collectors CF1-CF4. An intermediate pipe 25a comprising a transverse tubular part 26a and four connections in a direction parallel to the geometric axes of the collectors CR1, CR2 is provided in order to be connected, at the ends of each of these collectors, in a sealed manner to flanges. A central channel 27a, parallel to the collectors, is provided on the opposite side in order to connect the transverse channel 26a to the system of valves 14b.

The system of valves 14b comprises a casing 28 in which the following are fitted according to a specific and fixed configuration:
  piping 29 with a valve and connection for the filtrate;
  piping 30 which is bent vertically downwards, with a valve and connection for the residue;
  preferably straight piping 31 with a value and connection, for the supply.

The apertures in this piping which are situated on the assembly 14a side occupy a specific position in space which is determined by the fitting onto the casing 28, and the same applies to the discharge apertures situated on the opposite side.

The filtrate channel 24a is connected to the piping 29; the residue channel 27a is connected to the piping 30, whereas the supply piping 20 is connected to the piping 31.

FIG. 13 illustrates in perspective, with a limited number of modules, a row of the device 14a in FIG. 12. The various elements of FIG. 13 which have already been described are designated by the same numerical references as those previously used, without repeating the description.

Similarly to FIG. 12, FIG. 14 shows the filtering device with an assembly 14a in which there are installed filtering modules MB1, MB2 . . . of type B. The frames 1.1, 1.2 are the same, and the position of the collectors CA1-CA4, CF1-CF4, CR1, CR2 has not changed.

On the other hand, the function of the upper collectors CF1-CF4 and of the lateral collectors CR1-CR2 has been changed over. The lateral collectors CR1, CR2 which are connected to the lateral tap-offs of the modules receive the filtrate, whereas the axial upper collectors CF1-CF4 which are connected to the axial discharge tap-offs of the modules receive the residue.

The group 14cb of intermediate pipes is designed to connect the ends of the collectors to the appropriate apertures in the system of valves 14b, the position of which has not changed.

The intermediate pipe 22b, 24b connects the ends of the axial upper collectors CF1-CF4 to the intake aperture of the residue duct 30b in the system of valves 14b. The intermediate pipe 25b, 27b connects the ends of the lateral collectors CR1, CR2 to the aperture in the filtrate duct 29, in the system of valves 14b. The transverse pipe 17 for the supply collectors has not been modified.

Similarly to FIG. 13, FIG. 15 illustrates a row of four modules of type B.

According to the invention, the filtering device can accommodate at least two different types of filtering modules A, B. The interchangeability of the modules is particularly quick and simple, in particular because of the support of the modules by the lower collectors and the change-over carried out by changing the groups 14ca, 14cb of intermediate pipes.

The invention claimed is:

1. A device for filtering of liquid, in particular water, comprising membrane filtering modules which are connected by pipes to valves in order to control the flows of liquid going to and from the modules, including a first block made up of an assembly of membrane filtering modules, a second block made up of a system of valves, and a third block made up of a group of intermediate pipes constituting an interface between the system of valves and the assembly of modules, only the interface requiring to be changed when changing the types of filtering modules, whilst the system of valves and the assembly of modules, except for changing the type of modules, remain unchanged,
wherein the assembly of membrane filtering modules comprises a supply collector, a first filtrate/residue collector, and a second filtrate/residue collector which are secured in a frame which is distinct from the collectors,
the frame of the assembly of modules is configured to receive at least two types of modules, wherein one of the two types of modules uses the first filtrate/residue collector as a filtrate collector and the second filtrate/residue collector as a residue collector, and the other of the two types of modules uses the first filtrate/residue collector as a residue collector and the second filtrate/residue collector as a filtrate collector, and
at least two groups of intermediate pipes which are associated respectively with each type of module, each being configured to be put into place in a removable manner between the assembly of modules and the system of valves, to ensure each of the first and second collectors flow to appropriate apertures in the system of valves.

2. The filtering device as claimed in claim 1, wherein the group of intermediate pipes is broken down into as many groups as there are different types (A, B) of modules, each different group being designed for an assembly with modules of the associated type.

3. The filtering device as claimed in claim 2, wherein it is broken down into as many intermediate groups as there are different types of modules (A, B), according to which the upper axial tap-off is designed for the discharge of one of the filtrate (Ha) or residue (Hb), whilst the upper lateral tap-off is designed for the discharge (Ra) of the other of the residue or filtrate (Rb), each intermediate group being designed for an assembly with modules of an associated type.

4. A device for filtering of liquid, in particular water, comprising membrane filtering modules which are connected by pipes to valves in order to control the flows of liquid going to and from the modules, including a first block made up of an assembly of membrane filtering modules, a second block made up of a system of valves, and a third block made up of a group of intermediate pipes constituting an interface between the system of valves and the assembly of modules, only the interface requiring to be changed when changing the types of filtering modules, whilst the system of valves and the assembly of modules, except for changing the type of modules, remain unchanged,
wherein:
each module comprises a lower tap-off, in general for the supply of liquid to be treated, an upper tap-off for filtrate or residue, and a lateral tap-off for residue or filtrate, the assembly comprising at least a supply collector, a filtrate collector and a residue collector which are secured in a frame which is distinct from the collectors;
the system of valves to control the flows of liquid going to and from the assembly of modules;
the group of intermediate pipes between the system of valves and the assembly of modules;
the system of valves is installed in a casing according to a fixed configuration;
the frame of the assembly of modules is designed to receive at least two types of modules, a first type (A) with an upper axial tap-off (Ha) for the filtrate and a lateral tap-off (Ra) for the residue, and a second type (B) with an upper axial tap-off (Hb) for the residue and a lateral tap-off (Rb) for the filtrate, with the passage from one type to the other giving rise to a change-over of the functions of the collectors (CF, CR); and
at least one group of intermediate pipes which is associated respectively with each type (A, B) of modules, and is designed to be put into place in a removable manner between the assembly of modules and the system of valves, and to assure the change-over of the collectors according to the type of modules.

5. The liquid filtering device as claimed in claim 4, including as many groups of intermediate pipes as there are types (A, B) of membrane filtering modules.

6. A device for filtering of liquid, in particular water, comprising membrane filtering modules which are connected by pipes to valves in order to control the flows of liquid going to and from the modules, including a first block made up of an assembly of membrane filtering modules, a second block made up of a system of valves, and a third block made up of a group of intermediate pipes constituting an interface between the system of valves and the assembly of modules, only the interface requiring to be chanced when changing the types of filtering modules, whilst the system of valves and the assembly of modules, except for changing the type of modules, remain unchanged, wherein:

the assembly of filtering modules is installed vertically according to at least one row, the modules of each row having their parallel vertical axes situated on the same plane, each module comprising in its lower part an axial tap-off (L1-L4) for the supply of liquid to be treated, and in particular water, and in its upper part an upper axial tap-off (H1-H4) for filtrate or residue, and a lateral tap-off for residue or filtrate, said assembly comprising at least;

a lower collector (CA) below the modules (M1-M4), the geometric axis of this collector being situated on the vertical plane of the axes of the modules of the row, with rising vertical piping, which can be connected to the axial supply tap-offs (L1-L4);

an upper collector (CF) above the modules, the geometric axis of this collector being situated on the vertical plane of the axes of the modules, this collector comprising descending vertical piping for connection to the axial tap-offs of the modules, the gap (E) between the lower collector (CA) and the upper collector (CF) being fixed;

wherein:

the lower collector (CA) is designed to be strong enough to constitute the means for support of the modules of the row, the lower tap-offs (L1-L4) of which are applied against the rising piping;

the filtering modules (M1-M4) have different lengths;

the gap (E) between the lower collector (CA) and the upper collector (CF) is determined in order to make it possible to receive the module with the longest length; and straight adapters are provided in order to permit fitting of shorter modules, and are arranged at the end of the upper tap-offs (H4, H3, H2), coaxially to the modules and to the piping.

7. The filtering device as claimed in claim 6, including as many lower supply collectors (CA1, CA2) and upper collectors (CF1, CF2) for axial tap-offs as there are rows of modules (MA1, MA2).

8. The filtering device as claimed in claim 6, wherein the lower collector (CA) is designed to receive a load of 180 kg per tap-off (L1-L4).

9. The filtering device as claimed in claim 6, wherein the axial tap-offs (L1-L4) of the modules are arranged so as to be supported against the end of the connection piping, the sealing being carried out at the level of the junction by sealing rings.

10. The filtering device as claimed in claim 6, wherein the lengths of the adapters are designed such that the upper end of the adapters is in the vicinity of the lower end of the piping, when the adapters are supported against the upper tap-offs (H4, H3, H2), and the sealing of the junction between the adapters and the piping is carried out by a sliding sleeve which is equipped with internal sealing means, the sleeve being in the retracted position on the adapter in order to allow the putting into place below the piping, then this sleeve is displaced upwards in order to cover the junction and establish the sealing.

* * * * *